(12) United States Patent
Shinjo et al.

(10) Patent No.: US 12,064,985 B2
(45) Date of Patent: Aug. 20, 2024

(54) ACTIVE ENERGY RAY-CURABLE LIQUID COMPOSITION, RECORDING METHOD, AND RECORDING APPARATUS

(71) Applicant: CANON KABUSHIKI KAISHA, Tokyo (JP)

(72) Inventors: Kenji Shinjo, Kanagawa (JP); Yohei Kohashi, Kanagawa (JP); Daisuke Yoshitoku, Kanagawa (JP); Kyosuke Deguchi, Kanagawa (JP); Yasuaki Tominaga, Kanagawa (JP); Tatsuaki Orihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 17/748,255

(22) Filed: May 19, 2022

(65) Prior Publication Data
US 2022/0396087 A1 Dec. 15, 2022

(30) Foreign Application Priority Data

May 25, 2021 (JP) .................................. 2021-087770
May 18, 2022 (JP) .................................. 2022-081502

(51) Int. Cl.
*B41M 7/00* (2006.01)
*C09D 11/30* (2014.01)
*C09D 133/26* (2006.01)

(52) U.S. Cl.
CPC ........... *B41M 7/0081* (2013.01); *C09D 11/30* (2013.01); *C09D 133/26* (2013.01)

(58) Field of Classification Search
CPC .... B41M 7/0081; C09D 11/30; C09D 133/26; C09D 4/00; C09D 11/101
See application file for complete search history.

(56) References Cited

U.S. PATENT DOCUMENTS 3,531,525 A 9/1970 Hoke et al.
3,585,125 A 6/1971 Hoke
(Continued)

FOREIGN PATENT DOCUMENTS

CA 1056990 A 6/1979
CN 110229549 A 9/2019
(Continued)

OTHER PUBLICATIONS

Tominaga et al., U.S. Appl. No. 17/749,425, filed May 20, 2022.
Extended European Search Report in European Application No. 22174775.1 (Oct. 2022).

*Primary Examiner* — Lisa Solomon
(74) *Attorney, Agent, or Firm* — Venable LLP

(57) ABSTRACT

The active energy ray-curable liquid composition according to the present disclosure is an active energy ray-curable liquid composition that contains water and a curable substance and is curable with an active energy ray, in which the curable substance contains a monofunctional polymerizable monomer having a structure represented by the Formula (1);

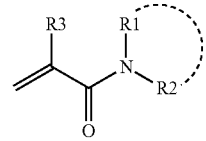

(1)

in Formula (1), R1 represents a hydrogen atom or a saturated hydrocarbon group, R2 represents a saturated hydrocarbon group that has at least one of a hydroxyl group or an amide bond and may contain a heteroatom, R3 represents a hydrogen atom or a methyl group, R1 and R2 may be bonded
(Continued)

together to form an aliphatic heterocycle together with a nitrogen atom substituted with R1 and R2 in a case where R1 represents a saturated hydrocarbon group, and a total number of carbon atoms of the saturated hydrocarbon groups represented by R1 and R2 is 5 or more.

13 Claims, 2 Drawing Sheets

(56) References Cited

U.S. PATENT DOCUMENTS

| | | |
|---|---|---|
| 3,729,456 A | 4/1973 | Hoke |
| 3,898,279 A | 8/1975 | Hoke |
| 3,974,115 A | 8/1976 | Laganis |
| 4,016,330 A | 4/1977 | Laganis |
| 4,313,124 A | 1/1982 | Hara |
| 4,345,262 A | 8/1982 | Shirato et al. |
| 4,459,600 A | 7/1984 | Sato et al. |
| 4,463,359 A | 7/1984 | Ayata et al. |
| 4,558,333 A | 12/1985 | Sugitani et al. |
| 4,723,129 A | 2/1988 | Endo et al. |
| 4,740,796 A | 4/1988 | Endo et al. |
| 5,658,376 A | 8/1997 | Noguchi et al. |
| 5,837,045 A | 11/1998 | Johnson et al. |
| 5,851,280 A | 12/1998 | Belmont et al. |
| 6,076,919 A | 6/2000 | Shirota et al. |
| 6,354,698 B1 | 3/2002 | Tachihara et al. |
| 6,612,688 B2 | 9/2003 | Tachihara et al. |
| 8,690,306 B2 | 4/2014 | Amao et al. |
| 8,905,534 B2 | 12/2014 | Amao et al. |
| 2009/0186960 A1 | 7/2009 | Moszner et al. |
| 2012/0249700 A1 | 10/2012 | Amao et al. |

FOREIGN PATENT DOCUMENTS

| | | | |
|---|---|---|---|
| DE | 1930506 A1 | 1/1970 | |
| DE | 2556954 A1 | 7/1976 | |
| EP | 2 505 622 A1 | 10/2012 | |
| EP | 2505622 A1 * | 10/2012 | ........... C09D 11/101 |
| JP | 59-123670 A | 7/1984 | |
| JP | 8-143802 A | 6/1996 | |
| JP | 8-209048 A | 8/1996 | |
| JP | 10-140065 A | 5/1998 | |
| JP | 11-188870 A | 7/1999 | |
| JP | 2962880 B2 | 10/1999 | |
| JP | 3246949 B2 | 1/2002 | |
| JP | 2006-231830 A | 9/2006 | |
| JP | 2007-099802 A | 4/2007 | |
| JP | 2012-214561 A | 11/2012 | |
| JP | 2013-018846 A | 1/2013 | |
| JP | 2017-160380 A | 9/2017 | |
| JP | 2017-165840 A | 9/2017 | |

\* cited by examiner

ACTIVE ENERGY RAY-CURABLE LIQUID COMPOSITION, RECORDING METHOD, AND RECORDING APPARATUS

BACKGROUND OF THE INVENTION

Field of the Invention

The present disclosure relates to an active energy ray-curable liquid composition, and a recording method and a recording apparatus that use the active energy ray-curable liquid composition as an aqueous ink material.

Description of the Related Art

Conventionally, regarding ink jet recording-type image forming methods, a technique using an active energy ray-curable liquid composition as an ink is known. In a case where the active energy ray-curable liquid composition is used as an ink, the use of a non-aqueous or aqueous curable substance as a curable substance is considered. Examples of the ink using a non-aqueous curable substance include a so-called oil-based ink that is prepared by dispersing a pigment in an organic solvent, and a so-called 100% curable ink (non-solvent ink) that contains a liquid monomer oligomer and a pigment dispersion without using an organic solvent. However, because the organic solvent or low-molecular-weight monomer contained in these inks easily volatilizes in the atmosphere, careful consideration needs to be given to the environmental impact. In addition, regarding the 100% curable ink, there is a concern over chemical safety such as skin irritation. Furthermore, because all the ink components applied to a recording medium should be made into a cured film, roughness is likely to occur in a recording portion and a non-recording portion, which makes it difficult to obtain a glossy image.

On the other hand, because the ink using an aqueous curable substance uses, as a solvent, an aqueous solvent containing water as a main component, the volatilization of the solvent imposes an extremely low environmental load. In addition, the occurrence of roughness, which is a concern arising in a case where the 100% curable ink is used, can be suppressed. For the aforementioned reasons, regarding the ink jet recording method, there are needs to develop a technique using an active energy ray-curable liquid composition that uses an aqueous curable substance and to develop an aqueous curable substance that is applicable to such a technique. Such an aqueous curable substance is required to have various characteristics such as the characteristics of an aqueous solution and the characteristics of a cured film. As means for improving these characteristics, Japanese Patent Application Laid-Open No. 2013-018846 and Japanese Patent Application Laid-Open No. 2012-214561 have suggested the use of a water-soluble acrylamide-based monomer and the use of a composition of such a monomer.

SUMMARY OF THE INVENTION

An object of the present disclosure is to provide an active energy ray-curable liquid composition that exhibits excellent characteristics of an aqueous solution and excellent characteristics of a cured film when used as an aqueous ink material. Another object of the present disclosure is to provide a recording method and a recording apparatus that use the active energy ray-curable liquid composition and contribute to the formation of a high-quality image.

According to an aspect of the present disclosure, there is provided an active energy ray-curable liquid composition curable with an active energy ray, the composition containing water and a curable substance, in which the curable substance is a monofunctional polymerizable monomer having a structure represented by the following General Formula (1);

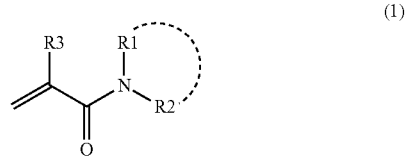

(In General Formula (1), R1 represents a hydrogen atom or a saturated hydrocarbon group, R2 represents a saturated hydrocarbon group that has at least one of a hydroxyl group or an amide bond and may contain a heteroatom, R3 represents a hydrogen atom or a methyl group, R1 and R2 may be bonded together to form an aliphatic heterocycle together with a nitrogen atom substituted with R1 and R2 in a case where R1 represents a saturated hydrocarbon group, and a total number of carbon atoms of the saturated hydrocarbon groups represented by R1 and R2 is 5 or more.)

According to an aspect of the present disclosure, there is provided a recording method including an ink application step of applying an aqueous ink containing the aforementioned active energy ray-curable liquid composition to a recording medium and an active energy ray irradiation step of irradiating the aqueous ink applied to the recording medium with an active energy ray.

According to an aspect of the present disclosure, there is provided a recording apparatus including an ink application device that applies an aqueous ink containing the active energy ray-curable liquid composition to a recording medium and an active energy ray irradiation device that irradiates the aqueous ink applied to the recording medium with an active energy ray.

Further features of the present disclosure will become apparent from the following description of exemplary embodiments with reference to the attached drawings.

DESCRIPTION OF THE EMBODIMENTS

Figure 1:
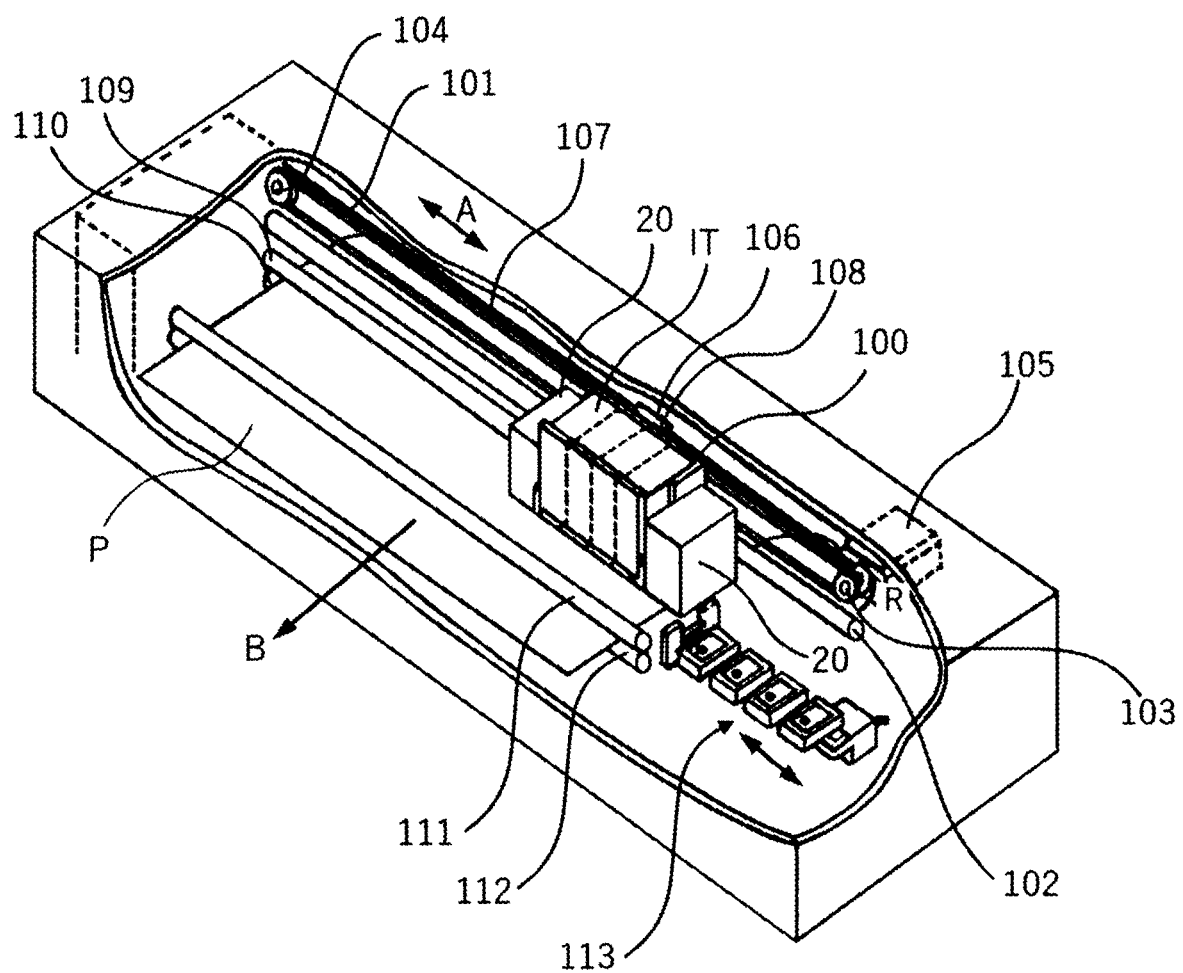
FIG. 1 is a schematic view illustrating a configuration of an ink jet recording apparatus according to an embodiment of the present disclosure.

The curable substance disclosed in Japanese Patent Application Laid-Open No. 2013-018846 is a water-soluble polyfunctional acrylamide compound having a characteristic structure, and has both the water solubility and photocurability. Furthermore, Japanese Patent Application Laid-Open No. 2012-214561 has reported an ink composition prepared by combining a monofunctional acrylamide-based monomer with a polyfunctional monomer having the structure described in Japanese Patent Application Laid-Open No. 2013-018846. In this ink composition, as a curable substance, the monofunctional acrylamide-based monomer is combined with the polyfunctional monomer so that the ink composition gives appropriate flexibility to a cured film having problems of stiffness and brittleness resulting from the structure described in Japanese Patent Application Laid-Open No. 2013-018846, and exhibits excellent characteristics of a cured film. However, because the curable substance retains water solubility before being cured, the problem of water resistance still exists.

According to the studies by the inventors of the present disclosure, it has been revealed that in a case where an acrylamide-based monomer having high water solubility is used as a curable substance, a problem arises in achieving both the characteristics of a cured film and the water resistance. That is, because the curable substance described in Japanese Patent Application Laid-Open No. 2013-018846 has a tetrafunctional structure, the crosslink density is too high, and the obtained cured film is hard and brittle. In a case where the curable substance is combined with the monofunctional monomer described in Japanese Patent Application Laid-Open No. 2012-214561 so as to improve this problem, due to the use of the water-soluble monofunctional monomer having a low molecular weight and high hydrophilicity, water solubility and excellent characteristics of a cured film are exhibited. However, it has been revealed that the crosslink density is reduced, and water resistance deteriorates due to the high hydrophilicity.

Meanwhile, Japanese Patent Application Laid-Open No. 2017-160380 describes that an active energy ray-curable composition containing an acrylic ester monofunctional monomer having hydrogen bonding amide bonds in the structure exhibits excellent characteristics of a cured film due to the intramolecular interaction between the amide bonds even though the composition is a monofunctional compound. However, in the invention described in Japanese Patent Application Laid-Open No. 2017-160380, the composition is used in a non-aqueous ink that does not contain water. In a case where this composition is used in an aqueous ink, as described in Japanese Patent Application Laid-Open No. 2007-099802, the hydrolysis of the acrylic acid ester causes a problem in the stability of the ink.

Therefore, the inventors of the present disclosure conducted intensive studies on an active energy ray-curable liquid composition that exhibits excellent characteristics of an aqueous solution and excellent characteristics of a cured film when used as an aqueous ink material, and have accomplished the present disclosure.

Hereinafter, the present disclosure will be specifically described with reference to preferable embodiments.

<Active Energy Ray-Curable Liquid Composition>

Hereinafter, the active energy ray-curable liquid composition (hereinafter, also simply called "liquid composition") according to the present disclosure will be specifically described.

The liquid composition according to the present disclosure is a liquid composition that contains water and a curable substance containing a monofunctional polymerizable monomer having a structure represented by the following General Formula (1) and is curable with an active energy ray. The liquid composition may further contain other components such as an active energy ray polymerization initiator and a coloring material.

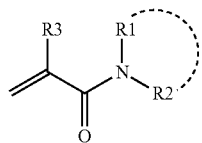

(1)

(In General Formula (1), R1 represents a hydrogen atom or a saturated hydrocarbon group, R2 represents a saturated hydrocarbon group that has at least one of a hydroxyl group or an amide bond and may contain a heteroatom, R3 represents a hydrogen atom or a methyl group, R1 and R2 may be bonded together to form an aliphatic heterocycle together with a nitrogen atom substituted with R1 and R2 in a case where R1 represents a saturated hydrocarbon group, and a total number of carbon atoms of the saturated hydrocarbon groups represented by R1 and R2 is 5 or more).

(1) Curable Substance

As the curable substance, any curable substance can be used without particular limitation as long as the substance contains a monofunctional polymerizable monomer represented by the above General Formula (1). The polymerizable monomer represented by the General Formula (1) is a (meth)acrylamide-based monofunctional curable substance. In the present specification, "(meth)acrylamide" means "methacrylamide" or "acrylamide".

Specifically, the polymerizable group represented by General Formula (1) represents an N-substituted (meth)acrylamide group or an N,N-disubstituted (meth)acrylamide group.

In General Formula (1), R1 represents a hydrogen atom or a saturated hydrocarbon group. Examples of the saturated hydrocarbon group include a saturated hydrocarbon group having 1 to 10 carbon atoms. Specific examples thereof include a linear or branched alkyl group having 1 to 10 carbon atoms and the like. In a case where R1 as a saturated hydrocarbon group and R2 do not form an aliphatic heterocycle, the saturated hydrocarbon group is preferably a linear or branched alkyl group having 1 to 8 carbon atoms, and more preferably a linear or branched alkyl group having 1 to 4 carbon atoms. Furthermore, in a case where R1 and R2 do not form an aliphatic heterocycle, from the viewpoint of the characteristics of an aqueous solution (the storage stability of the aqueous solution containing the polymerizable monomer) and the characteristics of a cured film, R1 is preferably a hydrogen atom or a methyl group and particularly preferably a hydrogen atom.

R2 represents a saturated hydrocarbon group that has at least one of a hydroxyl group or an amide bond and may contain a heteroatom. Examples of the heteroatom include a nitrogen atom, an oxygen atom, a sulfur atom and the like. Specifically, examples of the saturated hydrocarbon group that may contain a heteroatom include a saturated hydrocarbon group containing an ether bond (—O—), a carbonyl bond (—C(=O)—), a sulfone bond (—SO$_2$—) or a sulfonamide bond (—SO$_2$—NH—). The amide bond of R2 may be formed of the carbonyl bond.

Examples of the saturated hydrocarbon group include a saturated hydrocarbon group having 1 to 20 carbon atoms. Specific examples thereof include a linear or branched alkyl group having 1 to 20 carbon atoms and the like. Among these, a linear or branched alkyl group having 4 to 15 carbon atoms is preferable, and a linear or branched alkyl group having 5 to 10 carbon atoms is more preferable. The saturated hydrocarbon group may have a cycloalkyl group that has 3 to 10 carbon atoms and preferably has 5 or 6 carbon atoms. In this case, the number of carbon atoms of the saturated hydrocarbon group including the number of carbon atoms of the cycloalkyl group is in a range of 1 to 20. In addition, one or more carbon atoms constituting the cycloalkyl group may be substituted with a heteroatom so as to constitute a saturated hydrocarbon group (aliphatic heterocycle) that may contain the aforementioned amide bond or the aforementioned heteroatom. That is, the saturated hydrocarbon group may have an aliphatic heterocycle. Specifically, the structures of curable substances 9, 10, 14 and 15 and the like shown in the following Table 1 correspond to the curable substance described so far. These curable substances have a structure containing a saturated hydrocarbon group having a cyclohexyl group having 6 carbon atoms, in which one or two carbon atoms constituting the cyclohexyl group are substituted with a nitrogen atom or an oxygen atom. The nitrogen atom and the adjacent carbonyl bond constitute an amide bond together, and the oxygen atom constitutes an ether bond. The aliphatic heterocycle formed by the substitution of one or more carbon atoms constituting the cycloalkyl group with the aforementioned heteroatom is preferably a 5-membered ring such as pyrrolidine, imidazolidine or pyrrolidone or a 6-membered ring such as piperidine, piperazine, morpholine or piperidone, and more preferably a 6-membered ring.

R3 represents a hydrogen atom or a methyl group. From the viewpoint of reactivity, R3 is preferably a hydrogen atom.

In a case where R1 in General Formula (1) is a saturated hydrocarbon group, R1 and R2 may be bonded together to form an aliphatic heterocycle together with a nitrogen atom substituted with R1 and R2. Examples of the aliphatic heterocycle that R1 and R2 form together with a nitrogen atom of a (meth)acrylamide group include a 5-membered ring such as pyrrolidine, imidazolidine or pyrrolidone and a 6-membered ring such as piperidine, piperazine, morpholine or piperidone. Among these, the 6-membered ring is preferable as the aliphatic heterocycle.

In the General Formula (1), the total number of carbon atoms of the saturated hydrocarbon group represented by R1 and the saturated hydrocarbon group represented by R2 is 5 or more. From the viewpoint of the water solubility of the monomer, the curing properties, and the water resistance of the cured film, the total number of carbon atoms is preferably 5 to 20 and more preferably 5 to 15. Furthermore, for example, as in the following curable substance 1, in a case where R1 is a hydrogen atom and R2 is a linear alkyl group having a hydroxyl group at the terminal, the total number of carbon atoms is preferably 5 to 9. The total number of carbon atoms is the total number of carbon atoms of the saturated hydrocarbon groups. Therefore, the number of carbon atoms constituting the amide bond that R2 has or the carbonyl bond that R2 may contain is not included in the total number of carbon atoms. In contrast, the number of carbon atoms (without an unsaturated bond) constituting the cycloalkyl group or aliphatic heterocycle that the saturated hydrocarbon group represented by R2 may have is included in the total number of carbon atoms.

In a case where R1 and R2 in General Formula (1) do not form an aliphatic heterocycle, from the viewpoint of the water solubility of the monomer, the curing properties, and the water resistance of the cured film, the total number of carbon atoms of the saturated hydrocarbon group that is directly bonded to a nitrogen atom of the (meth)acrylamide structure is preferably 5 to 8. More specifically, "total number of carbon atoms of the saturated hydrocarbon group that is directly bonded to a nitrogen atom of the (meth) acrylamide structure" means the total number of carbon atoms of the saturated hydrocarbon group "directly" bonded to the (meth)acrylamide structure in the saturated hydrocarbon groups represented by R1 and R2. That is, for example, in the case of the following curable substance 5, the number of carbon atoms of the amide bond of R2 and the number of carbon atoms of the saturated hydrocarbon group closer to the right side of the paper than the amide bond are not included in the total number of carbon atoms, and the total number of carbon atoms is "5".

In a case where R1 and R2 in General Formula (1) form an aliphatic heterocycle, from the viewpoint of the water solubility of the monomer, the curing properties, and the water resistance of the cured film, the total number of carbon atoms of the saturated hydrocarbon group that is directly bonded to a nitrogen atom of the (meth)acrylamide structure is preferably 4 to 10.

The amount of the monofunctional polymerizable monomer represented by General Formula (1) added is not particularly limited. Here, from the viewpoint of ink ejection performance, the amount of the monomer added is preferably 50% by mass or less with respect to the total amount of the liquid composition. The amount of the monomer added is more preferably 30% by mass or less, and particularly preferably 20% by mass or less from the viewpoint of the gloss uniformity of an image. In a case where the amount of the monofunctional polymerizable monomer added exceeds 50% by mass, sometimes the gloss uniformity of the obtained image deteriorates. The amount of the monofunctional polymerizable monomer represented by General Formula (1) added can be, for example, 2% by mass or more and preferably 5% by mass or more with respect to the total amount of the liquid composition.

The curable substance according to the present disclosure may contain two or more kinds of polymerizable monomers represented by the General Formula (1). As the curable substance, the polymerizable monomer represented by the General Formula (1) and other known curable substances can be used in combination. Specific examples of the known curable substances include acryloylmorpholine, N-vinylpyrrolidone, acrylamide, hydroxyethylacrylamide, methylenebisacrylamide, a monoacrylic acid ester of oligoethylene oxide, a monoacrylic acid ester of a dibasic acid and the like. From the viewpoint of characteristic of a cured film, it is preferable to use a polyfunctional polymerizable monomer as a curable substance used together with a monofunctional polymerizable monomer having a structure represented by the General Formula (1). Examples of commercially available products of known curable substances include polyfunctional polymerizable monomers such as FOM-03008 (water-soluble difunctional acrylamide), FOM-03007 (water-soluble trifunctional acrylamide), FOM-03006 (water-soluble tetrafunctional acrylamide) and FOM-03009 (water-soluble tetrafunctional acrylamide) (all are trade names, manufactured by FUJIFILM Wako Pure Chemical Corporation).

The content of the known curable substances used in combination with the aforementioned polymerizable monomer is not particularly limited. Here, in a case where the content of the known curable substances is too high with respect to the polymerizable monomer according to the present disclosure, sometimes the effects of the present disclosure are reduced. Therefore, in a case where the known curable substances are used in combination with the polymerizable monomer, the ratio of the amount of the monofunctional polymerizable monomer represented by the General Formula (1) to the total amount of polymerizable monomers (curable substances) contained in the liquid composition is preferably 10% by mass to 90% by mass.

The ratio is more preferably 20% by mass to 90% by mass. In a case where the polymerizable monomer represented by General Formula (1) and a known curable substance are combined as curable substances, it is preferable that these be blended so that the total amount of these curable substances falls into the range described above, that is, the total amount of these curable substances is not more than 50% by mass of the total amount of the liquid composition. The same shall be applied to a more preferable range and the like.

The method for synthesizing the polymerizable monomer represented by General Formula (1) of the present disclosure is not particularly limited. For example, an amine compound may be condensed with (meth)acryloyl chloride, (meth)acrylic anhydride and the like by a known method so that the polymerizable monomer is obtained.

Specific structures of the polymerizable monomer represented by General Formula (1) are shown in the following Table 1, but the polymerizable monomer is not limited to these structures.

TABLE 1

| Curable substance | Structure | Total number of carbon atoms of saturated hydrocarbon groups represented by R1 and R2 | Number of hydroxyl groups | contained in R20 Number of amide bonds contained in R2 |
|---|---|---|---|---|
| Curable substance 1 | | 5 | 1 | — |
| Curable substance 2 | | 5 | 1 | — |
| Curable substance 3 | | 6 | 1 | — |
| Curable substance 4 | | 7 | 1 | — |
| Curable substance 5 | | 8 | — | 1 |
| Curable substance 6 | | 9 | — | 1 |
| Curable substance 7 | | 9 | — | 1 |
| Curable substance 8 | | 9 | — | 1 |

TABLE 1-continued

| Curable substance | Structure | Total number of carbon atoms of saturated hydrocarbon groups represented by R1 and R2 | Number of hydroxyl groups contained in R20 | Number of amide bonds contained in R2 |
|---|---|---|---|---|
| Curable substance 9 | | 9 | — | 1 |
| Curable substance 10 | | 10 | — | 1 |
| Curable substance 11 | | 7 | 1 | 1 |
| Curable substance 12 | | 8 | 1 | 1 |
| Curable substance 13 | | 10 | 1 | 1 |
| Curable substance 14 | | 12 | 1 | 1 |
| Curable substance 15 | | 10 | — | 2 |
| Curable substance 16 | | 8 | 1 | — |

(2) Active Energy Ray Polymerization Initiator (Hereinafter, Abbreviated to "Polymerization Initiator")

Any polymerization initiator can be used without particular limitation, as long as the polymerization initiator can generate active species initiating the polymerization of a curable substance by absorbing and emitting an active energy ray. Here, in the aforementioned curable substance, a curing reaction markedly proceeds by the generation of radicals. Therefore, for such a curable substance, a polymerization initiator generating radicals by absorbing and emitting an active energy ray is preferable.

In a case where the liquid composition according to the present disclosure is used as an aqueous ink, in order that the liquid composition exhibits curing properties to the maximum, it is preferable that the polymerization initiator have a water-soluble group. Specific examples of the water-soluble group include a hydroxyl group, a carboxylic acid group, a sulfonic acid group, a phosphoric acid group, a carboxylic acid base, a sulfonic acid base, a phosphoric acid base, an ether group, an amide group and the like. In addition, in a case where a coloring material having an anionic group is used in combination with the polymerization initiator, in order to suppress hydrolysis, the polymerization initiator needs to have an organic group other than an ester group. Specific examples of the polymerization initiator include the following compounds A to C, but the polymerization initiator of the present disclosure is not limited thereto.

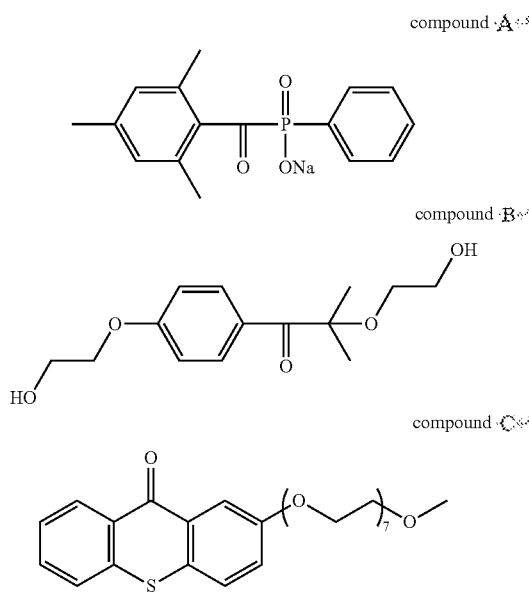

compound A compound B compound C

In the present disclosure, it is also possible to use the aforementioned polymerization initiator in combination with a sensitizer or to use two or more kinds of polymerization initiators in combination. In a case where two or more kinds of polymerization initiators are used in combination, by the use of an active energy ray of a wavelength that cannot be effectively used when one kind of polymerization initiator is used, more radicals could be generated. In a case where an electron beam curing method is adopted in which an electron beam is used as an active energy ray for curing the liquid composition, the use of the aforementioned polymerization initiator is not essential.

The content of the polymerization initiator with respect to the total amount of the liquid composition is preferably in a range of 0.01% by mass to 20% by mass, more preferably in a range of 0.01% by mass to 10% by mass, and even more preferably in a range of 0.01% by mass to 5% by mass. In a case where the content of the polymerization initiator is too high, sometimes the unreacted polymerization initiator remains in the cured film, which reduces the strength of the cured film.

(3) Solvent

The liquid composition according to the present disclosure contains at least water as a solvent, and may contain an organic solvent if necessary. The water is not particularly limited, and deionized water, distilled water and the like can be used as the water. The content of the water varies with the use or form of water and cannot be defined as a uniform numerical value. It is preferable that the content of the water be 10% by mass or more with respect to the total amount of the liquid composition. Especially, in a case where the liquid composition is used as an aqueous ink to be used for an ink jet recording method, the content of the water with respect to the total amount of the liquid composition is preferably 30% by mass or more, and more preferably 50% by mass or more. The content of the water can be, for example, 90% by mass or less with respect to the total amount of the liquid composition.

The organic solvent is added for the purpose of especially making water in the ink non-volatile, adjusting viscosity or surface tension of the ink, giving wettability for a recording medium and the like. In a case where the organic solvent is added, the amount of the organic solvent added can be 0.1% by mass to 40% by mass with respect to the total amount of the liquid composition. The organic solvents that can be used in the present disclosure are listed below. An organic solvent randomly selected from the following ones can be added to the liquid composition of the present disclosure.

Glycol ethers such as ethylene glycol monomethyl ether, diethylene glycol monoethyl ether, triethylene glycol monomethyl ether and propylene glycol monomethyl ether; monohydric alcohols such as methanol, ethanol, propanol, butanol and pentanol; polyhydric alcohols such as glycerin, polyethylene glycol, propylene glycol, polypropylene glycol, butanediol, heptanediol and hexanediol; amides such as 2-pyrrolidone and the like.

Furthermore, in the present disclosure, the curable substance may be emulsified and dispersed using a known dispersion technique as appropriate without being completely dissolved in the solvent so that the curable substance is used as an emulsion. Likewise, various encapsulation techniques can also be used.

(4) Other Components

The liquid composition according to the present disclosure may contain a coloring material. In a case where the liquid composition contains a coloring material, the liquid composition according to the present disclosure can be used as a certain type of ink. In a case where the liquid composition contains a coloring material, the content of the coloring material is preferably 0.3% by mass to 15% by mass with respect to the total amount of the liquid composition. Hereinafter, the configuration adopted in a case where the liquid composition contains a coloring material and the coloring material to be used will be described.

In a case where the liquid composition of the present disclosure is applied to an ink containing a coloring material, the liquid composition can be used as a colored active energy ray-curable ink that is cured by being irradiated with an active energy ray and the like. As the coloring material used in this case, a pigment dispersion prepared by uniformly dispersing a pigment in an aqueous medium is preferable. As the pigment dispersion, an aqueous gravure ink, an aqueous pigment dispersion liquid for writing tools, a pigment dispersion used for conventionally known ink jet inks and the like can all be preferably used. Among these, a pigment dispersion in which a pigment is stably dispersed in an aqueous medium by an anionic group is extremely preferable.

The pigment dispersion in which a pigment is stably dispersed in an aqueous medium by an anionic group is disclosed in Japanese Patent Application Laid-Open No. H8-143802, Japanese Patent Application Laid-Open No. H8-209048, Japanese Patent Application Laid-Open No. H10-140065, the specification of U.S. Pat. No. 5,837,045 and the specification of U.S. Pat. No. 5,851,280. In the liquid composition of the present disclosure, various pigment dispersions described above can be used as a coloring material.

Examples of the pigment to be used include carbon black, an organic pigment and the like. Examples of the carbon black include furnace black, lamp black, acetylene black, channel black and the like. It goes without saying that in addition to these, conventionally known carbon black can also be used. Furthermore, a fine particle of a magnetic material such as magnetite or ferrite, titanium black and the like may also be used as a pigment.

As the organic pigment, for example, the following pigments can be used.

An azo pigment such as toluidine red or Hansa yellow. A phthalocyanine-based pigment such as phthalocyanine blue or phthalocyanine green. A quinacridone-based pigment such as quinacridone red or quinacridone magenta. A perylene-based pigment such as perylene red or perylene scarlet. An isoindolinone-based pigment such as isoindolinone yellow or isoindolinone orange. An imidazolone-based pigment such as benzimidazolone yellow or benzimidazolone orange. A pyranthrone-based pigment such as pyranthrone red or pyranthrone orange.

Usable organic pigments identified by the color index (C. I.) number will be shown below.

C. I. Pigment Yellow: 12, 13, 14, 17, 20, 24, 55, 74, 83, 86, 93, 97, 98, 109, 110, 117, 120, 125, 128, 137, 138, 139 and the like. C. I. Pigment Yellow: 147, 148, 150, 151, 153, 154, 155, 166, 168, 180, 185 and the like. C. I. Pigment Orange: 16, 36, 43, 51, 55, 59, 61, 71 and the like. C. I. Pigment Red: 9, 48, 49, 52, 53, 57, 97, 122, 123, 149, 168, 175, 176, 177, 180, 192, 202, 209, 215, 216, 217 and the like. or C. I. Pigment Red: 220, 223, 224, 226, 227, 228, 238, 240, 254, 255, 272 and the like. C. I. Pigment Violet: 19, 23, 29, 30, 37, 40, 50 and the like. C. I. Pigment Blue: 15, 15:1, 15:3, 15:4, 15:6, 22, 60, 64 and the like. C. I. Pigment Green: 7, 36 and the like. C. I. Pigment Brown: 23, 25, 26 and the like.

It goes without saying that in addition to these, various conventionally known organic pigments can also be used.

In a case where the aforementioned various pigments are used, a dispersant may be used in combination with the pigments. The dispersant is not particularly limited as long as the dispersant can stably disperse a pigment in an aqueous medium. For example, it is possible to use a block polymer, a random polymer, a graft polymer and the like. An example thereof will be shown below.

A styrene-acrylic acid copolymer, a styrene-maleic acid copolymer, a vinylnaphthalene-acrylic acid copolymer, a vinylnaphthalene-maleic acid copolymer or salts of these and the like. A benzyl methacrylate-methacrylic acid copolymer or salts thereof and the like.

Furthermore, in a case where the aforementioned various pigments are used, it is also possible to use a so-called self-dispersible pigment that bonds an ionic group to the surface of a pigment particle so that the pigment particle can be dispersed in a medium without using a dispersant.

In the liquid composition of the present disclosure, various dyes can also be used as a coloring material. Usable dyes identified by the color index (C. I.) number will be shown below.

C. I. Acid Yellow 11, 17, 23, 25, 29, 42, 49, 61, 71 and the like. C. I. Direct Yellow 12, 24, 26, 44, 86, 87, 98, 100, 130, 132, 142 and the like. C. I. Acid Red 1, 6, 8, 32, 35, 37, 51, 52, 80, 85, 87, 92, 94, 115, 180, 254, 256, 289, 315, 317 and the like. C. I. Direct Red 1, 4, 13, 17, 23, 28, 31, 62, 79, 81, 83, 89, 227, 240, 242, 243 and the like. C. I. Acid Blue 9, 22, 40, 59, 93, 102, 104, 113, 117, 120, 167, 229, 234, 254 and the like. C. I. Direct Blue 6, 22, 25, 71, 78, 86, 90, 106, 199 and the like. C. I. Direct Black: 7, 19, 51, 154, 174, 195 and the like.

The liquid composition of the present disclosure can be used as a so-called "transparent ink" without containing the aforementioned coloring material. In this case, because the liquid composition does not contain a coloring material, a film that is substantially colorless and transparent can be obtained. Examples of uses of the "transparent ink" include the following. For example, the transparent ink can be used for an undercoat for giving various types of suitability for image recording to a recording medium, protection of the surface of an image formed of a general ink, an overcoat for decoration or for giving gloss and the like. In this case, depending on the purpose such as prevention of oxidation or prevention of fading, a colorless pigment, a fine particle and the like that are not aimed at coloring can also be dispersed and contained in the liquid composition of the present disclosure. In a case where these are added to the liquid composition, in any of the undercoat and overcoat, various characteristics of a recorded article, such as image quality, fastness and workability (handleability), can be improved.

The liquid composition according to the present disclosure may also contain a surfactant, a curing accelerator, a crosslinking agent, a water-soluble auxiliary agent, and a viscosity modifier. As for the surfactant and the like, known ones can be appropriately selected and used.

Examples of the active energy ray used for curing the liquid composition of the present disclosure include an electron beam, an ultraviolet ray, an α-ray, a β-ray, a γ-ray, an X-ray and the like. Among these, the ultraviolet ray is preferable. The cumulative irradiation energy can be, for example, 20 mJ/cm$^2$ to 20,000 mJ/cm$^2$. The cumulative irradiation energy can be appropriately adjusted depending, for example, on whether or not the liquid composition contains a component such as a coloring material, the type of the coloring material and the like.

<Recording Apparatus>

The recording apparatus according to the present disclosure has at least an ink application device that applies an aqueous ink containing the active energy ray-curable liquid composition according to the present disclosure to a recording medium and an active energy ray irradiation device that irradiates the aqueous ink applied to the recording medium with an active energy ray. As the ink application device, an ink application device for any recording method that can apply the aqueous ink according to the present disclosure to a recording medium may be used. The liquid composition according to the present disclosure brings about excellent effects especially in a case where the liquid composition is applied to a recording apparatus for an ink jet recording method. That is, it is preferable that the ink application device include a recording head that ejects an ink by an ink jet recording method. In addition, the liquid composition of the present disclosure is extremely useful as a liquid to be stored in a cartridge (liquid cartridge) having a liquid storage portion and as a liquid with which the liquid cartridge is to be filled. Furthermore, the liquid composition according to the present disclosure has a structure containing a flexible amide bond and a saturated hydrocarbon bond. Therefore, the liquid composition exhibits excellent adhesiveness to various recording media such as a non-absorbent medium including PET, PC or PMMA, a poorly absorbent medium such as glossy paper for offset printing and an absorbent medium including PPC paper or the like.

The ink jet recording apparatus includes a recording head that ejects an ink by an ink jet recording method. As the ink jet recording method, a method is preferable which makes it easy to realize a high-density multiorifice head as a recording head, makes it possible to record high-resolution and high-quality images at a high speed, and ejects an ink by the application of heat energy.

As the recording head for the method of ejecting an ink by the application of heat energy, for example, recording heads adopting the basic principle disclosed in the specification of U.S. Pat. No. 4,723,129 and the specification of U.S. Pat. No. 4,740,796 are preferable. Such a method is applicable to both the so-called on-demand recording and continuous recording. In the case of on-demand recording, it is preferable that at least one driving signal which corresponds to recording information and causes rapid temperature rise beyond the nucleate boiling temperature be applied to an electrothermal converter disposed in correspondence with a sheet or liquid path holding an ink. This is an effective method because in this method, heat energy is generated in the electrothermal converter so that film boiling occurs in a heat acting surface of the recording head, which consequently makes it possible to form bubbles in the ink at the driving signal in a one-to-one correspondence manner.

By the growth and contraction of bubbles, the ink is ejected from an ejection orifice, and at least one droplet is formed. It is preferable that the driving signal be in the form of pulsed signal, because then bubbles grow and contract immediately and properly, and the ink can be ejected particularly with excellent responsiveness. As the pulsed driving signal, the signals described in the specification of U.S. Pat. No. 4,463,359 and the specification of U.S. Pat. No. 4,345,262 are suitable. It is preferable to adopt the conditions relating to the rate of temperature rise of a heat acting surface described in the specification of U.S. Pat. No. 4,313,124.

For the recording head, a configuration (linear liquid flow path or right-angled liquid flow path) is suitable in which an ejection orifice, a liquid path and an electrothermal converter are combined as disclosed in each of the specifications described above. In addition, the configuration disclosed in the specification of U.S. Pat. No. 4,558,333 and the specification of U.S. Pat. No. 4,459,600 in which a heat acting portion is disposed in a bending region is also suitable. Furthermore, the atmosphere communication-type ejection method described in Japanese Patent No. 2962880, Japanese Patent No. 3246949, and Japanese Patent Application Laid-Open No. H11-188870 is also effective. In addition, a configuration (Japanese Patent Application Laid-Open No. S59-123670 or the like) is also effective in which an ejection orifice shared by a plurality of electrothermal converters is adopted as an ejection portion of the electrothermal converters.

As a full-line type recording head having a length corresponding to the maximum width of a recording medium on which the ink jet recording apparatus can perform recording, the following recording heads are used. For example, any of a configuration in which the plurality of recording heads disclosed in the aforementioned specification is combined so that the aforementioned length is satisfied or a configuration as one integrally formed recording head may be adopted. Furthermore, a replaceable chip-type recording head that can be electrically connected to the body of the apparatus or supplied with an ink from the body of the apparatus by being attached to the ink jet recording apparatus or a cartridge-type recording head integrally provided in a recording head is also effective.

It is also preferable to add recovery means for the recording head, spare auxiliary means and the like. Specific examples thereof include capping means for the recording head, cleaning means, pressing or suction means, an electrothermal converter, a heating element, preheating means, a pre-ejection mode and the like.

FIG. 1 is a perspective view schematically illustrating an example of the configuration of an ink jet recording apparatus. The ink jet recording apparatus illustrated in FIG. 1 is a recording apparatus that uses a short serial head and adopts a shuttle method of performing recording while scanning a recording medium with the head in a width direction of the recording medium. A carriage 100 is connected to an endless belt 101 and is movable along a guiding shaft 102. The endless belt 101 is looped over pulleys 103 and 104. The driving shaft of a motor 105 is connected to the pulley 103. Therefore, by the rotary driving of the motor 105, the carriage 100 reciprocates along the guiding shaft 102 in a main scanning direction indicated by an arrow A.

A recording head (not being illustrated in the drawing) that includes a plurality of ink jet nozzles arranged in a row and an ink tank IT as a container for storing an ink are mounted on the carriage 100. At least one end of the carriage 100 in the main scanning direction A is provided with an active energy ray irradiation portion 20. Therefore, immediately after the ink is applied to the recording medium, the recording surface can be irradiated with an active energy ray from the active energy ray irradiation portion 20. Examples of the active energy ray include an electron beam, an ultraviolet ray, an α-ray, a β-ray, a γ-ray, an X-ray and the like. Among these, the ultraviolet ray is preferable. The active energy ray irradiation portion 20 is an active energy ray irradiation device that irradiates the ink applied to the recording medium with an active energy ray. In FIG. 1, the active energy ray irradiation portion 20 is provided at both ends of the carriage 100. The active energy ray irradiation may be performed immediately after the application of the ink as illustrated in FIG. 1. Alternatively, as long as the recording medium is capable of absorbing the ink, the active energy ray irradiation may be performed at a certain interval from the application of the ink. The number of times of the active energy ray irradiation is not limited to one, and the active energy ray irradiation may be performed in multiple stages.

In the recording head, within an ejection orifice surface facing paper P as a recording medium, a plurality of ink ejection orifices arranged in a transport direction of the paper P (a sub-scanning direction indicated by an arrow B) is formed. Furthermore, the recording head is provided with ink paths that communicate with the plurality of ink ejection orifices respectively. For each of the ink paths, an electrothermal converter that generates heat energy for ejecting the ink is provided.

An electric pulse corresponding to the driving data is applied to the electrothermal converter. As a result, the electrothermal converter generates heat, and the heat causes film boiling in the ink so that bubbles are formed, which causes the ink to be ejected from the ink ejection orifices. The ink paths communicate with a common liquid chamber shared by the ink paths. The common liquid chamber is connected to the ink tank IT.

The ink jet recording apparatus illustrated in FIG. 1 is provided with a linear encoder 106 for detecting the moving position of the carriage 100. That is, in a linear scale 107 provided in the moving direction of the carriage 100, over a length of 1 inch, 1,200 slits are formed, for example, at equal intervals. On the other hand, on the carriage 100 side, for example, a slit detection system 108 having a light emitting portion and a light receiving sensor and a signal processing circuit are provided. Therefore, from the linear encoder 106, as the carriage 100 moves, an ejection timing signal showing the ink ejection timing and the information on the moving position of the carriage 100 are output. Whenever the slit of the linear scale 107 is detected, the ink is ejected. In this way, an image with a resolution of 1,200 dpi can be recorded in the main scanning direction.

The paper P as a recording medium is intermittently transported in the sub-scanning direction indicated by the arrow B orthogonal to the operation direction of the carriage 100. The paper P is supported by a pair of roller units 109 and 110 on the upstream side in the transport direction and a pair of roller units 111 and 112 on the downstream side in the transport direction. The paper P is transported in a state of staying flat for the recording head by constant tension applied to the paper P. The driving force for the roller units 111 and 112 is supplied from a paper transporting motor that is not illustrated in the drawing.

In the ink jet recording apparatus illustrated in FIG. 1, the operation of performing recording along a width corresponding to the width of the ejection orifices arranged in the recording head while moving the carriage 100 and the transport of the paper P are alternately repeated so that an image can be recorded on the entire paper P. If necessary, the carriage 100 stops at the home position at the start of recording or during recording. At the home position, a cap member 113 for capping the ejection surface side of each recording head is provided. The cap member 113 is connected to suction recovery means (not being illustrated in the drawing) that forcibly absorbs the ink from the ejection orifice so as to prevent clogging of the ejection orifice.

In addition to the shuttle method described above, there is a line method using a line head including recording elements arranged to deal with the entire area of one side of a recording medium. In the line method, by scanning the recording medium in a direction orthogonal to the arrangement direction of the recording elements, it is possible to record an image on the entire surface of the recording medium. Therefore, a transport system such as a carriage enabling a short head to perform scanning is not necessary. In addition, complicated scanning control for the carriage movement and the recording medium is not necessary, and only the recording medium moves. Therefore, compared to the shuttle method, the line method can further increase the recording speed.

<Recording Method>

The recording method according to the present disclosure has at least an ink application step of applying an aqueous ink containing the active energy ray-curable liquid composition according to the present disclosure to a recording medium and an active energy ray irradiation step of irradiating the aqueous ink applied to the recording medium with an active energy ray. The ink application step may be any of recording methods that can apply the aqueous ink according to the present disclosure to a recording medium. Particularly, it is preferable that the ink application step be performed by an ink jet recording method.

As specifically described so far with reference to the aforementioned preferable embodiments, according to the present disclosure, an active energy ray-curable liquid composition can be provided which exhibits excellent characteristics of an aqueous solution and excellent characteristics of a cured film when used as an aqueous ink material. According to the present disclosure, an active energy ray-curable liquid composition can be provided which exhibits excellent ejection performance regardless of the ejection method when used in an ink jet recording apparatus, and exhibits high long-term storage stability.

According to an aspect of the present disclosure, an active energy ray-curable liquid composition can be obtained which exhibits excellent characteristics of an aqueous solution and excellent characteristics of a cured film when used as an aqueous ink material. In addition, according to an aspect of the present disclosure, a recording method and a recording apparatus can be obtained which use the active energy ray-curable liquid composition and contribute to the formation of a high-quality image.

EXAMPLES

Hereinafter, the present disclosure will be more specifically described with reference to more specific examples of the active energy ray-curable liquid composition according to the present disclosure and comparative examples thereof.

The curable substance used in the examples of the present disclosure was selected from the curable substances shown in the aforementioned Table 1. In the comparative examples, the curable substance (hereinafter, called "comparative compound") shown in the following Table 2 was used. The comparative compound 1 is trade name DAAM (manufactured by KJ Chemicals corporation), the comparative compound 2 is trade name HEAA (manufactured by KJ Chemicals corporation), and the comparative compound 3 is trade name ACMO (manufactured by KJ Chemicals corporation). Comparative compounds 4 and 5 were prepared. The synthesis of the comparative compounds 4 and 5 will be described later.

TABLE 2

| Curable substance of comparative example | Structure | Total number of carbon atoms of saturated hydrocarbon groups represented by R1 and R2 | Number of hydroxyl groups contained in R2 |
|---|---|---|---|
| Comparative compound 1 | (structure) | 5 | — |
| Comparative compound 2 | (structure) | 2 | 1 |

TABLE 2-continued

| Curable substance of comparative example | Structure | Total number of carbon atoms of saturated hydrocarbon groups represented by R1 and R2 | Number of hydroxyl groups contained in R2 |
|---|---|---|---|
| Comparative compound 3 | (acryloyl morpholine structure) | 4 | — |
| Comparative compound 4 | CH2=CH-C(O)-NH-CH2CH2CH2-OH | 3 | 1 |
| Comparative compound 5 | CH2=CH-C(O)-NH-CH2CH2CH2CH2-OH | 4 | 1 |

(1) Synthesis of Curable Substance

Synthesis Example 1: Synthesis of Curable Substance 2, 3, and 16, and Comparative Compound 4 and 5

To a liquid in which 87.3 g (1.21 mol) of acrylic acid was added to 484 ml of THF under light shielding, 1000 ppm of hydroquinone and 25 g (0.242 mol) of 4-amino-3 methyl-1 butanol were added, and the mixture was stirred for 30 minutes. To the agitated liquid 67 g (0.242 mol) of DMT-MM (4, 6-dimethoxy-1, 3, 5-triazine-2-yl)-4 methylmorpholinium chloride) was added and reacted by stirring for 2 h. The filtrate was obtained by filtering the liquid after the reaction with celite. The filtrate was washed with 400 mL of THF. The washed filtrate was concentrated, purified by silica gel column chromatography, the objective product was separated, and 500 ppm of methoxyphenol as a polymerization inhibitor was added and concentrated to obtain the curable substance 2.

The curable substance 3 was obtained by the same synthetic method as the curable substance 2 except that 4-amino-3-methyl-1-butanol was changed to 6-amino-1 hexanol.

A curable substance 16 was obtained by the same synthetic method as the curable substance 2 except that 4-amino-3 methyl-1 butanol was changed to 8-amino-1 octanol.

A comparative compound 4 was obtained by the same synthetic method as the curable substance 2 except that 4-amino-3 methyl-1 butanol was changed to 3-amino-1 propanol.

A comparative compound 5 was obtained by the same synthetic method as the curable substance 2 except that 4-amino-3 methyl-1 butanol was changed to 4-amino-1 butanol.

Synthesis Example 2: Synthesis of Curable Substance 4

To a liquid obtained by adding 44 g (0.341 mol) of 4-piperidine ethanol to 440 ml of THF under light shielding, 1000 ppm of hydroquinone and 35.1 g (0.511 mol) of ice-cooled acrylic acid were added, and the mixture was stirred for 30 minutes. Further 94.4 g (0.341 mol) of DMT-MM was added to the agitated liquid and reacted by stirring for 3 hours. The filtrate was obtained by filtering the liquid after the reaction with celite. The filtrate was washed with 400 mL of THF. The washed filtrate was concentrated, purified by silica gel column chromatography, the objective product was separated, and 500 ppm of methoxyphenol as a polymerization inhibitor was added and concentrated to obtain the curable substance 4.

Synthesis Example 3: Synthesis of Curable Substance 5, 8, 12, and 13

A compound in which OH group of the curable substance 1 was changed to COOH group was obtained by the same synthetic method as the curable substance 2 except that 4-amino-3-methyl-1-butanol was changed to 6-amino hexanoic acid. To a liquid obtained by adding 35 g (0.189 mol) of the compound to 700 ml of methylene chloride, 1000 ppm of hydroquinone was added, and the mixture was stirred for 30 minutes. Further, 36.2 g (0.189 mol) of 1-(3-dimethylaminopropyl)-3-ethylcarbodiimide as a carbodiimide-based condensing agent WSC (Water Soluble Carbodiimide) and 21.1 g (0.282 mol) of 2-methoxy-ethylamine were sequentially added to the agitated liquid, and the mixture was reacted by stirring for 1 hour and a half. A curable substance 5 was obtained by adding methanol to the liquid after the reaction, then concentrating the mixture, purifying the mixture by silica gel column chromatography, separating the objective substance, and concentrating the mixture.

The curable substance 8 was obtained by the same synthetic method as the curable substance 5 except that 2-methoxy-ethylamine was changed to N, N'-diethylamine.

A curable substance 12 was obtained by the same synthetic method as the curable substance 5 except that 2-methoxy-ethylamine was changed to 2-amino-1-propanol.

A curable substance 13 was obtained by the same synthetic method as the curable substance 5 except that 2-methoxy-ethylamine was changed to 4-amino-2-methyl-1-butanol.

(2) Preparation of Ink

Examples 1 to 8 and Comparative Examples 1 to 5

By using each of the curable substances shown in the following Tables 3-1 and 3-2, inks 1 to 8 and C1 to C5 having the following makeup including the active energy ray-curable liquid composition according to Examples 1 to 8 and Comparative Examples 1 to 5 were prepared. Among the following components, "Acetylenol E100" is a trade name of a nonionic surfactant (ethylene oxide adduct of acetylene glycol) manufactured by Kawaken Fine Chemicals Co., Ltd.

(Makeup of Ink)
- Curable substance: 20% by mass
- Active energy ray polymerization initiator (the compound A): 2% by mass
- Surfactant (Acetylenol E100 (trade name, manufactured by Kawaken Fine Chemicals Co., Ltd.)): 1% by mass
- Deionized water: 77% by mass (3) Evaluation on Characteristic of Aqueous Solution of Ink (Liquid Composition) (Storage Stability of Aqueous Solution Containing Polymerizable Monomer)

The obtained ink 1 to 8 and C1 to C5 were allowed to stand for 1 hour, and the storage stability of the aqueous solution (aqueous ink) containing the polymerizable monomer was evaluated by visually observing the presence or absence of the polymerizable monomer which was not dissolved in the ink after standing. As a result, it was confirmed that the polymerizable monomer of both the ink 1 to 8 and C1 to C5 was dissolved in the ink, and that the polymerizable monomer was not separated from the ink.

(4) Formation of Cured Film by Bar Coating

The obtained inks 1 to 8 and C1 to C5 were applied to a PET film (trade name: easy-adhesion white PET, manufactured by TEIJIN LIMITED.) by bar coating at 10 g/m$^2$, thereby forming a coating film. Then, by using a UV-LED irradiation device (trade name: L6011, wavelength 395 nm) manufactured by USHIO, INC., the coating film was irradiated at a cumulative irradiation energy of 1,000 mJ/cm$^2$, thereby forming a cured film.

(5) Evaluation on Characteristic of Cured Film (Scratch Resistance)

Three hours after the cured films were formed, for each of the formed cured films, a pencil hardness test was performed according to JIS K 5600-5-4: 1999 (scratch hardness (pencil method)). The extent of scratches and peeling other than indentations was visually observed, and the scratch resistance was evaluated based on the following evaluation standard. The evaluation results are shown in Tables 3-1 and 3-2. Regarding the pencil hardness in the tables, "4B" means a level at which the cured film is ranked as D but peeling does not occur at 4B, and "5B or less" means that peeling occurs even at 4B.

A: Scratches or peeling was not observed even at a pencil hardness of 2H.

B: Scratches or peeling was not observed at a pencil hardness of H or less.

C: Scratches or peeling was not observed at a pencil hardness of HB or less.

D: Scratches or peeling was observed even at a pencil hardness of 2B or less.

TABLE 3-1

| Ink No. | Example No. | Structure | Total number of carbon atoms of saturated hydrocarbon groups represented by R1 and R2 | Number of hydroxyl groups (contained in R2) | Number of amide bonds (contained in R2) | Cured film Scratch resistance Pencil hardness | Rank |
|---|---|---|---|---|---|---|---|
| Example 1 | Ink 1 | Curable substance 13 | 10 | 1 | 1 | 2H or more | A |
| Example 2 | Ink 2 | Curable substance 12 | 8 | 1 | 1 | 2H or more | A |
| Example 3 | Ink 3 | Curable substance 8 | 9 | — | 1 | 2H or more | A |
| Example 4 | Ink 4 | Curable substance 5 | 8 | — | 1 | 2H or more | A |

TABLE 3-1-continued

| Ink No. | Example No. | Structure | Total number of carbon atoms of saturated hydrocarbon groups represented by R1 and R2 | contained in R2 Number of hydroxyl groups | Number of amide bonds | Cured film Scratch resistance Pencil hardness | Rank |
|---|---|---|---|---|---|---|---|
| Example 5 Ink 5 | Curable substance 4 | (structure: N-acyl piperidine with ethanol substituent) | 7 | 1 | — | 2H or more | A |
| Example 6 Ink 6 | Curable substance 3 | (acrylamide with hexyl-OH chain) | 6 | 1 | — | 2H or more | A |
| Example 7 Ink 7 | Curable substance 2 | (propanamide with methyl-branched hydroxyl chain) | 5 | 1 | — | 2H or more | A |
| Example 8 Ink 8 | Curable substance 16 | (acrylamide with heptyl-OH chain) | 8 | 1 | — | H or less | B |

TABLE 3-2

| Ink No. | Example No. | Structure | Total number of carbon atoms of saturated hydrocarbon groups represented by R1 and R2 | contained in R2 Number of hydroxyl groups | Number of amide bonds | Cured film Scratch resistance Pencil hardness | Rank |
|---|---|---|---|---|---|---|---|
| Comparative Example 1 Ink C1 | Comparative compound 1 | (acrylamide with gem-dimethyl ketone) | 5 | — | — | Fail to evaluate peeling of film | — |
| Comparative Example 2 Ink C2 | Comparative compound 2 | (acrylamide ethanol) | 2 | 1 | — | 5B or less | D |
| Comparative Example 3 Ink C3 | Comparative compound 3 | (acryloyl morpholine) | 4 | — | — | 5B or less | D |
| Comparative Example 4 Ink C4 | Comparative compound 4 | (acrylamide propanol) | 3 | 1 | — | 4B | D |

TABLE 3-2-continued

| | | | Curable substance | | | | |
|---|---|---|---|---|---|---|---|
| | | | | Total number of carbon atoms of saturated hydrocarbon groups represented by R1 and R2 | contained in R2 | | Cured film |
| Ink No. | Example No. | Structure | | | Number of hydroxyl groups | Number of amide bonds | Scratch resistance |
| | | | | | | | Pencil hardness / Rank |
| Comparative Ink C5 | Comparative compound 5 | CH$_2$=CH—C(=O)—NH—(CH$_2$)$_4$—OH | | 4 | 1 | — | 3B / D |

Examples 9 to 17

(1) Preparation of Ink 9

A pigment (C. I. Pigment Red 122) and a dispersant (random copolymer of styrene/acrylic acid/ethyl acrylate, weight-average molecular weight=3,500, acid value=150 mgKOH/g) were mixed together and then dispersed in a beads mill. In this way, a magenta pigment dispersion having a pigment solid content of 10% by mass and a ratio of pigment:dispersant (mass ratio)=3:1 was obtained. Then, the following components were mixed together and thoroughly stirred, and then the mixture was filtered under pressure with a filter having a pore size of 0.5 thereby obtaining an ink 9 (magenta ink). The pH of the obtained magenta ink was 9. Among the following components, "FOM-03008" is a trade name of a curable substance (water-soluble difunctional acrylamide) manufactured by FUJIFILM Wako Pure Chemical Corporation.

(Makeup of Ink 9)
- Magenta pigment dispersion: 40% by mass
- Curable substance 13: 17% by mass
- Polymerizable monomer (FAM-03008 (trade name, manufactured by FUJIFILM Corporation)): 3% by mass
- Active energy ray polymerization initiator (the compound A): 3% by mass
- Surfactant (Acetylenol E100 (trade name, manufactured by Kawaken Fine Chemicals Co., Ltd.)): 1% by mass
- Deionized water: 36% by mass (2) Formation of Cured Film Using Ink Jet Recording Apparatus (Recording of Image)

Figure 2:
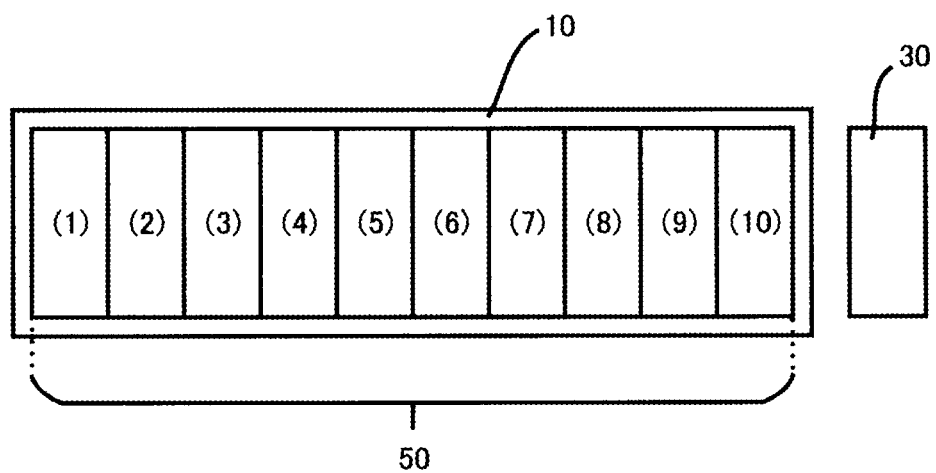
FIG. 2 is a schematic view illustrating a configuration of a recording head according to an embodiment of the present disclosure.

The inks 1 to 8 prepared in Examples 1 to 8 and the magenta ink 9 were mounted on an on-demand type ink jet recording apparatus (trade name: Pro-10, manufactured by Canon Inc.) which applies heat energy corresponding to a recording signal to an ink so that the ink is ejected. A UV-LED irradiation device (trade name: M30, manufactured by USHIO, INC., wavelength 395 nm) was mounted on a portion of the recording apparatus adjacent to a recording head. Specifically, as illustrated in FIG. 2, as a UV-LED irradiation device 30, the aforementioned device was mounted on a site adjacent to a mounting position (10) (mounting position of a GY cartridge) of a recording head 10 in an ink cartridge mounting position 50. Under the condition of 1-pass drawing in one direction, the cumulative irradiation energy of the active energy ray was 2,000 mJ/cm$^2$. For this ink jet recording apparatus, recording duty of an image recorded under the condition of applying 8 ink droplets each weighing 3.8 ng to a 1/600 inch×1/600 inch unit area at a resolution of 600 dpi×600 dpi is defined as 100%. By using this ink jet recording apparatus, an image described in the following section (3) was recorded on a PET film (trade name: easy-adhesion white PET, manufactured by TEIJIN LIMITED.), and the characteristics of the image were evaluated.

(3) Evaluation on Characteristics of Image

[Evaluation on Ejection Characteristics]

(Basic Ejection Properties)

By using the inks 1 to 8 and the magenta ink 9 and the aforementioned ink jet recording apparatus, suction recovery was performed, and the inks were left to stand for 1 minute. Then, a solid image was printed in 1 pass at 1,200 dpi and 100% duty. Ultraviolet irradiation was not performed after printing. The condition of the printed solid image was visually observed, and based on the following evaluation standard, the basic ejection properties of the ink were evaluated. The evaluation results are shown in Table 4.

A: Uniform solid image were formed, and scratches in the printed image were not observed.

C: Scratches in the positon of beginning of printing image in the printed image were observed (ejection failure).

(Storage Stability)

The storage stability of the ink was evaluated according to the same method and same evaluation standard as those in the evaluation on basic ejection properties, except that in the evaluation on basic ejection properties, the inks were left to stand for 3 days after the suction recovery. The evaluation results are shown in Table 4.

[Evaluation on Characteristics of Cured Film]

(Scratch Resistance)

By using the inks 1 to 8, the magenta ink 9 and the aforementioned ink jet recording apparatus, a 100% solid image was formed on a PET film (trade name: easy-adhesion white PET, manufactured by TEIJIN LIMITED.). Under the same irradiation condition (cumulative irradiation energy: 2,000 mJ/cm$^2$) as the irradiation condition adopted in recording the image described in the above section (2), ultraviolet ray irradiation was performed in parallel with recording, thereby obtaining a cured film (image). Three hours after the formation of the cured film, a pencil hardness test was performed according to JIS K 5600-5-4: 1999 (scratch hardness (pencil method)). The extent of scratches and peeling other than indentations was visually observed, and the scratch resistance of the ink was evaluated based on the following evaluation standard. The evaluation results are shown in Table 4.

A: Scratches or peeling was not observed even at a pencil hardness of 2H.

B: Scratches or peeling was not observed at a pencil hardness of H or less.

C: Scratches or peeling was not observed at a pencil hardness of HB or less.

D: Scratches or peeling was observed even at a pencil hardness of 2B or less.

(Water Resistance)

By using the prepared inks 1 to 8 and the magenta ink 9 and the aforementioned ink jet recording apparatus, a 100% solid image was formed on a PET film (trade name: easy-adhesion white PET, manufactured by TEIJIN LIMITED.). Under the same irradiation condition as the irradiation condition adopted in recording the image described in the above section (2), ultraviolet ray irradiation was performed in parallel with recording, thereby obtaining a cured film (image). One day after the formation of the cured film, 0.2 ml of deionized water was added dropwise to the image on the recording medium. After one minute, Silbon paper was placed on the image and then pulled in a state where a load of 40 g/cm² was being applied to the recording surface. Then, whether or not the image portion of the recording medium was peeled off due to rubbing was visually observed. In addition, whether or not a non-recording portion (blank portion) and the Silbon paper were stained due to the rubbing of the image portion was visually observed, and the water resistance of the ink was evaluated based on the following evaluation standard. The evaluation results are shown in Table 4.

A: The proportion of an area peeled off the image portion by rubbing was less than 3% in the area of the coating film, and the proportion of an area found not to be stained at all was 90% or more in the area of the Silbon paper.

C: The proportion of an area peeled off the image portion by rubbing was 3% or more in the area of the coating film, or the proportion of an area found not to be stained at all was less than 90% or more in the area of the Silbon paper.

TABLE 4

| Ink No. | Ejection characteristics | | Characteristics of cured film | |
|---|---|---|---|---|
| | Basic ejection properties | Storage stability | Scratch resistance | Water resistance |
| Example 9 | Ink 1 | A | A | A | A |
| Example 10 | Ink 2 | A | A | A | A |
| Example 11 | Ink 3 | A | A | A | A |
| Example 12 | Ink 4 | A | A | A | A |
| Example 13 | Ink 5 | A | A | A | A |
| Example 14 | Ink 6 | A | A | A | A |
| Example 15 | Ink 7 | A | A | A | A |
| Example 16 | Ink 8 | A | A | B | A |
| Example 17 | Ink 9 | A | A | A | A |

Examples 18 to 20

(1) Preparation of Ink

A yellow pigment dispersion was obtained in the same manner as that adopted for obtaining the magenta ink 9, except that instead of C. I. Pigment Red 122, C. I. Pigment Yellow 13 was used as a pigment. The obtained yellow pigment dispersion had a pigment solid content of 10% by mass, a ratio of pigment:dispersant (mass ratio)=3:1, and an average particle size of 130 nm. Furthermore, a cyan pigment dispersion was obtained in the same manner as that adopted for obtaining the magenta ink 9, except that instead of C. I. Pigment Red 122, C. I. Pigment Blue 15:3 was used as a pigment. The obtained cyan pigment dispersion had a pigment solid content of 10% by mass, a ratio of pigment:dispersant (mass ratio)=3:1, and an average particle size of 125 nm.

An ink 10 (yellow ink) and an ink 11 (cyan ink) were prepared in the same manner as that adopted for preparing the magenta ink 9, except that instead of the magenta pigment dispersion, the yellow pigment dispersion and the cyan pigment dispersion were used respectively.

(2) Evaluation on Characteristics of Image

By using the prepared yellow ink 10, cyan ink 11 and magenta ink 9, the characteristics were evaluated in the same manner as in Example 9. Here, in evaluating "characteristics of cured film", instead of the PET film, paper for offset recording (trade name: OK KANAFUJI, manufactured by Mitsubishi Paper Mills Limited.) was used. The results are shown in Table 5. The magenta ink 9 and the cyan ink 11 were combined at a ratio of 1:1 to constitute a two-color ink set, and the same evaluation as above was performed using the ink set. As a result, the same results as the results shown in Examples 18 to 20 were obtained.

TABLE 5

| Ink No. | Ejection characteristics | | Characteristics of cured film | |
|---|---|---|---|---|
| | Basic ejection properties | Storage stability | Scratch resistance | Water resistance |
| Example 18 | Ink 9 | A | A | A | A |
| Example 19 | Ink 10 | A | A | A | A |
| Example 20 | Ink 11 | A | A | A | A |

The disclosure of the embodiment includes the following configurations and processes.

(Configuration 1) An active energy ray-curable liquid composition that is curable with an active energy ray, the composition comprising:
water; and
a curable substance,
wherein the curable substance contains a monofunctional polymerizable monomer that has a structure represented by the following General Formula (1);

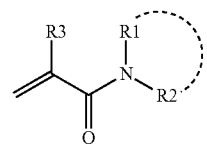

(1)

(in General Formula (1), R1 represents a hydrogen atom or a saturated hydrocarbon group, R2 represents a saturated hydrocarbon group that has at least one of a hydroxyl group or an amide bond and may contain a heteroatom, R3 represents a hydrogen atom or a methyl group, R1 and R2 may be bonded together to form an aliphatic heterocycle together with a nitrogen atom substituted with R1 and R2 in a case where R1 represents a saturated hydrocarbon group, and a total number of carbon atoms of the saturated hydrocarbon groups represented by R1 and R2 is 5 or more).

(Configuration 2) The active energy ray-curable liquid composition according to configuration 1,
wherein in a case where R1 and R2 in General Formula (1) do not form the aliphatic heterocycle, a total number of carbon atoms of a saturated hydrocarbon group that is directly bonded to a nitrogen atom of a (meth)acrylamide structure is 5 to 8.

(Configuration 3) The active energy ray-curable liquid composition according to configuration 1,
wherein in General Formula (1), R1 represents a saturated hydrocarbon group, and R1 and R2 are bonded together to form a 5-membered or 6-membered aliphatic heterocycle.

(Configuration 4) The active energy ray-curable liquid composition according to configuration 3,
wherein in General Formula (1), the total number of carbon atoms of the saturated hydrocarbon group that is directly bonded to the nitrogen atom of the (meth)acrylamide structure is 4 to 10.

(Configuration 5) The active energy ray-curable liquid composition according to any one of configurations 1 to 4,
wherein in General Formula (1), the total number of carbon atoms of the saturated hydrocarbon groups represented by R1 and R2 is 5 to 20.

(Configuration 6) The active energy ray-curable liquid composition according to any one of configurations 1 to 5, further comprising:
a polyfunctional polymerizable monomer.

(Configuration 7) The active energy ray-curable liquid composition according to any one of configurations 1 to 6,
wherein a content of the water is 30% by mass or more with respect to a total amount of the active energy ray-curable liquid composition.

(Configuration 8) The active energy ray-curable liquid composition according to configuration 6 or 7,
wherein a ratio of the monofunctional polymerizable monomer to a total amount of polymerizable monomers contained in the active energy ray-curable liquid composition is 10% to 90% by mass.

(Process 1) A recording method comprising:
applying an aqueous ink that contains the active energy ray-curable liquid composition according to any one of configurations 1 to 8 to a recording medium; and
irradiating the aqueous ink that is applied to the recording medium with an active energy ray.

(Process 2) The recording method according to process 1, wherein the applying of the aqueous ink is performed by an ink jet recording method.

(Configuration 9) A recording apparatus comprising:
an ink application device that applies an aqueous ink containing the active energy ray-curable liquid composition according to any one of configurations 1 to 8 to a recording medium; and
an active energy ray irradiation device that irradiates the aqueous ink applied to the recording medium with an active energy ray.

(Configuration 10) The recording apparatus according to configuration 11, wherein the ink application device includes a recording head that ejects an ink by an ink jet recording method.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. #2021-087770, filed May 25, 2021, and Japanese Patent Application No. 2022-081502, filed May 18, 2022 which are hereby incorporated by reference herein in their entirety.

What is claimed is:

1. An active energy ray-curable liquid composition that is curable with an active energy ray, the composition being an aqueous ink and comprising:
water; and
a curable substance,
wherein the curable substance contains a monofunctional polymerizable monomer that has a structure represented by general formula (1):

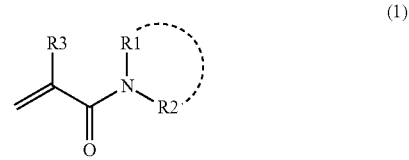

wherein R1 represents a hydrogen atom or a saturated hydrocarbon group, R2 represents a saturated hydrocarbon group that has at least one of a hydroxyl group or an amide bond and may contain a further heteroatom, R3 represents a hydrogen atom or a methyl group, R1 and R2 may be bonded together to form an aliphatic heterocycle together with a nitrogen atom substituted with R1 and R2 in a case where R1 represents a saturated hydrocarbon group, and a total number of carbon atoms of the saturated hydrocarbon groups represented by R1 and R2 is 5 or more.

2. The active energy ray-curable liquid composition according to claim 1, wherein in a case where R1 and R2 in the general formula (1) do not form the aliphatic heterocycle, a total number of carbon atoms of a saturated hydrocarbon group that is directly bonded to the nitrogen atom of the (meth)acrylamide structure is 5 to 8.

3. The active energy ray-curable liquid composition according to claim 1, wherein in the general formula (1), R1 represents a saturated hydrocarbon group, and R1 and R2 are bonded together to form a 5-membered or 6-membered aliphatic heterocycle.

4. The active energy ray-curable liquid composition according to claim 3, wherein in the general formula (1), the total number of carbon atoms of a saturated hydrocarbon group that is directly bonded to the nitrogen atom of the (meth)acrylamide structure is 4 to 10.

5. The active energy ray-curable liquid composition according to claim 1, wherein in the general formula (1), the total number of carbon atoms of the saturated hydrocarbon groups represented by R1 and R2 is 5 to 20.

6. The active energy ray-curable liquid composition according to claim 1, further comprising:
a polyfunctional polymerizable monomer.

7. The active energy ray-curable liquid composition according to claim 1, wherein a content of the water is 30% by mass or more with respect to a total amount of the active energy ray-curable liquid composition.

8. The active energy ray-curable liquid composition according to claim 6, wherein a ratio of the monofunctional polymerizable monomer to a total amount of polymerizable monomers contained in the active energy ray-curable liquid composition is 10% to 90% by mass.

9. A recording method comprising:
applying an aqueous ink, which is an active energy ray-curable liquid composition, to a recording medium; and
irradiating the aqueous ink that is applied to the recording medium with an active energy ray, wherein the active energy ray-curable liquid composition is curable with the active energy ray and comprises:
water; and
a curable substance,
wherein the curable substance contains a monofunctional polymerizable monomer that has a structure represented by general formula (1):

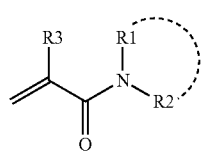

(1)

wherein R1 represents a hydrogen atom or a saturated hydrocarbon group, R2 represents a saturated hydrocarbon group that has at least one of a hydroxyl group or an amide bond and may contain a further heteroatom, R3 represents a hydrogen atom or a methyl group, R1 and R2 may be bonded together to form an aliphatic heterocycle together with a nitrogen atom substituted with R1 and R2 in a case where R1 represents a saturated hydrocarbon group, and a total number of carbon atoms of the saturated hydrocarbon groups represented by R1 and R2 is 5 or more.

10. The recording method according to claim 9, wherein the applying of the aqueous ink is performed by an ink jet recording method.

11. A recording apparatus comprising:
an ink application device that applies an aqueous ink, which is an active energy ray-curable liquid composition, to a recording medium; and
an active energy ray irradiation device that irradiates the aqueous ink applied to the recording medium with an active energy ray,
wherein the active energy ray-curable liquid composition is curable with the active energy ray and comprises:
water; and
a curable substance,
wherein the curable substance contains a monofunctional polymerizable monomer that has a structure represented by general formula (1):

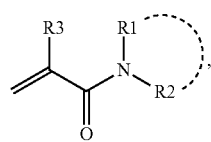

(1)

wherein R1 represents a hydrogen atom or a saturated hydrocarbon group, R2 represents a saturated hydrocarbon group that has at least one of a hydroxyl group or an amide bond and may contain a further heteroatom, R3 represents a hydrogen atom or a methyl group, R1 and R2 may be bonded together to form an aliphatic heterocycle together with a nitrogen atom substituted with R1 and R2 in a case where R1 represents a saturated hydrocarbon group, and a total number of carbon atoms of the saturated hydrocarbon groups represented by R1 and R2 is 5 or more.

12. The recording apparatus according to claim 11, wherein the ink application device includes a recording head that ejects the aqueous ink by an ink jet recording method.

13. The active energy ray-curable liquid composition according to claim 1, further comprising an active energy ray polymerization initiator.

* * * * *